United States Patent
DePari et al.

(10) Patent No.: US 7,953,109 B1
(45) Date of Patent: May 31, 2011

(54) SYSTEM FOR CONTROLLING OPTICAL TRANSCEIVERS

(75) Inventors: Thomas J DePari, North Smithfield, RI (US); Daniel J. Rodrigues, North Attleboro, MA (US)

(73) Assignee: EMC Corporation, Hopkinton, MA (US)

( * ) Notice: Subject to any disclaimer, the term of this patent is extended or adjusted under 35 U.S.C. 154(b) by 243 days.

(21) Appl. No.: 12/343,531

(22) Filed: Dec. 24, 2008

(51) Int. Cl.
    *G06F 13/00* (2006.01)

(52) U.S. Cl. .................................. 370/466; 709/232

(58) Field of Classification Search .................. 370/360, 370/363, 364, 381–386, 466, 467; 709/224, 709/225, 232
See application file for complete search history.

(56) References Cited

U.S. PATENT DOCUMENTS

| 2003/0188030 | A1* | 10/2003 | Bellon | 709/250 |
| 2004/0028063 | A1* | 2/2004 | Roy et al. | 370/402 |
| 2010/0042793 | A1* | 2/2010 | Awakura | 711/162 |

* cited by examiner

*Primary Examiner* — Pankaj Kumar
*Assistant Examiner* — Duc T Duong

(57) ABSTRACT

An input/output section for producing a disable signal at a data transmitter enable/disable terminal of a transceiver in response to the transmit disable enable at the disable signal port of a processor independent of the transmit control signal at the transmit signal port of source of data to be transmitted by the transceiver.

2 Claims, 1 Drawing Sheet

SYSTEM FOR CONTROLLING OPTICAL TRANSCEIVERS

TECHNICAL FIELD

This invention relates generally to optical transceivers and more particularly to system for controlling optical transceivers.

BACKGROUND

As is known in the art, optical transceivers are used to transmit and receive data. As is also known in the art, one type of transceiver is a small form-factor pluggable (SFP) transceiver; a compact, hot-pluggable optical transceiver used in optical communications for both telecommunication and data communications applications. It interfaces a network device mother board (for a switch, router or similar device) to a fiber optic or unshielded twisted pair networking cable. It is a popular industry format supported by several fiber optic component vendors. SFP transceivers are designed to support SONET, Gigabit Ethernet, Fibre Channel, and other communications standards. The standard has expanded to SFP+ to support data rates up to 10.0 Gbit/s (that include data rates for 8 gigabit Fibre Channel, and 10 GbE).

As is also known in the art, one application for an SFP transceiver is in a data storage system wherein a host computer/server is coupled to a bank of disk drives through a system interface. Here a bank of disk drives and the host computer/server system are coupled together through the interface. The interface includes "front end", directors (or controllers) and "back end" disk directors (or controllers). The front end", directors (or controllers) and "back end" disk directors (or controllers) include, among other things, protocol translators for, in the front end directors, converting between the protocol used by the host computer/server and the interface and for, in the back end directors, converting between the protocol used by the disk drives and the interface. The interface operates the directors in such a way that they are transparent to the computer. That is, user data in the host computer/server is stored in, and retrieved from, the bank of disk drives in such a way that the host computer/server merely thinks it is operating with one large memory.

In one such data storage system, the user data passes between the host computer/server though optical transceivers such as SFP transceivers.

SUMMARY

In accordance with the present invention, an input/output section is producing a disable signal at a data transmitter enable/disable terminal of a transceiver in response to the transmit disable enable at the disable signal port of a processor independent of the transmit control signal at the transmit signal port of source of data to be transmitted by the transceiver.

In one embodiment, the input/output section includes: (a) a transmit protocol translation section for translating a protocol used by the user data passing from a bank of disk drives to a processor to a protocol used by the user data passing from the processor to the host computer/server, such transmit protocol translation section having a data port coupled to a data port of the processor and a transmit signal port for producing a transmit control signal; (b) a data transceiver having: an data transmitter enable/disable terminal; and a data terminal for receiving the user data from the transmit protocol translation section and for optically transmitting the user data from the processor through the transmit protocol translation section and then to the host computer/server in response to an transmit enable signal fed to the data transmitter enable/disable terminal and for inhibiting the user data from the processor from the passing from the transmit protocol translation section and then to the host computer/server in response to a transmit disable signal fed to the data transmitter enable/disable terminal; (c) a transmit gate for producing the disable signal at the data transmitter enable/disable terminal of the transceiver in response to the transmit disable enable at the disable signal port of the processor independent of the transmit control signal at the transmit signal port of the protocol translation section.

In one embodiment, a data storage system is provided having a host computer/server, a bank of disk drives, and an interface for coupling user data between the host/computer/server and the bank of disk drives. The interface includes a processor for controlling the user data as the user data passes between the host computer/server and the bank of disk drives. The processor produces at each one of a first and second control signal port either a transmit enable signal or a transmit disable signal. The interface includes an input/output section comprises: (a) a transmit protocol translation section for translating a protocol used by the user data passing from a bank of disk drives to a processor to a protocol used by the user data passing from the processor to the host computer/server, such transmit protocol translation section having a data port coupled to a data port of the processor and a transmit signal port for producing a transmit control signal; (b) a data transceiver having: an data transmitter enable/disable terminal; and a data terminal for receiving the user data from the transmit protocol translation section and for optically transmitting the user data from the processor through the transmit protocol translation section and then to the host computer/server in response to an transmit enable signal fed to the data transmitter enable/disable terminal and for inhibiting the user data from the processor from the passing from the transmit protocol translation section and then to the host computer/server in response to a transmit disable signal fed to the data transmitter enable/disable terminal; (c) a transmit gate for producing the disable signal at the data transmitter enable/disable terminal of the transceiver in response to the transmit disable enable at the disable signal port of the processor independent of the transmit control signal at the transmit signal port of the protocol translation section.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
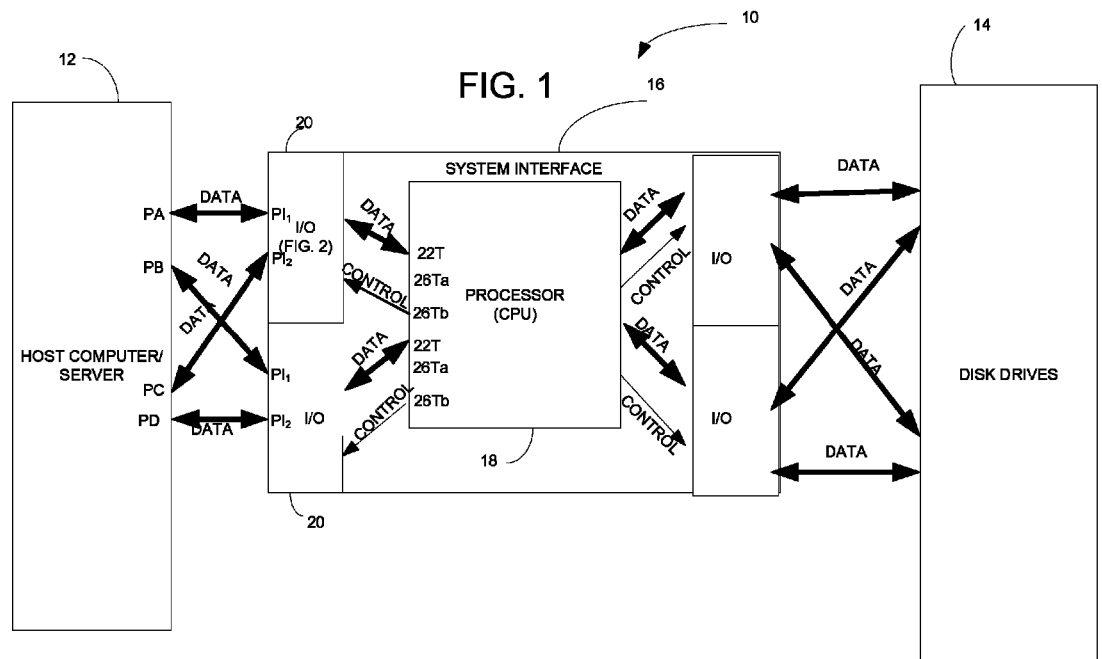
FIG. 1 is a block diagram of data storage system according to the invention.

Referring now to FIG. 1, a data storage system 10 is shown having: a host computer/server 12; a bank of disk drives 14; and an interface 16 for coupling user data between the host computer/server 12 and the bank of disk drives 14.

The interface 16 includes a processor 18 for controlling the user data as the user data passes between the host computer/server 12 and the bank of disk drives 16. The interface 16 includes a plurality of, here for example four, identical input/output (I/O) sections 20, an exemplary one thereof being shown in detail in FIG. 2. More particularly, each one of the I/O sections has a pair of redundant I/O ports PI1 and PI2, each one being coupled to a corresponding one of four I/O ports PA, PB, PC and PD, of the host computer/server 12, as shown.

Figure 2:
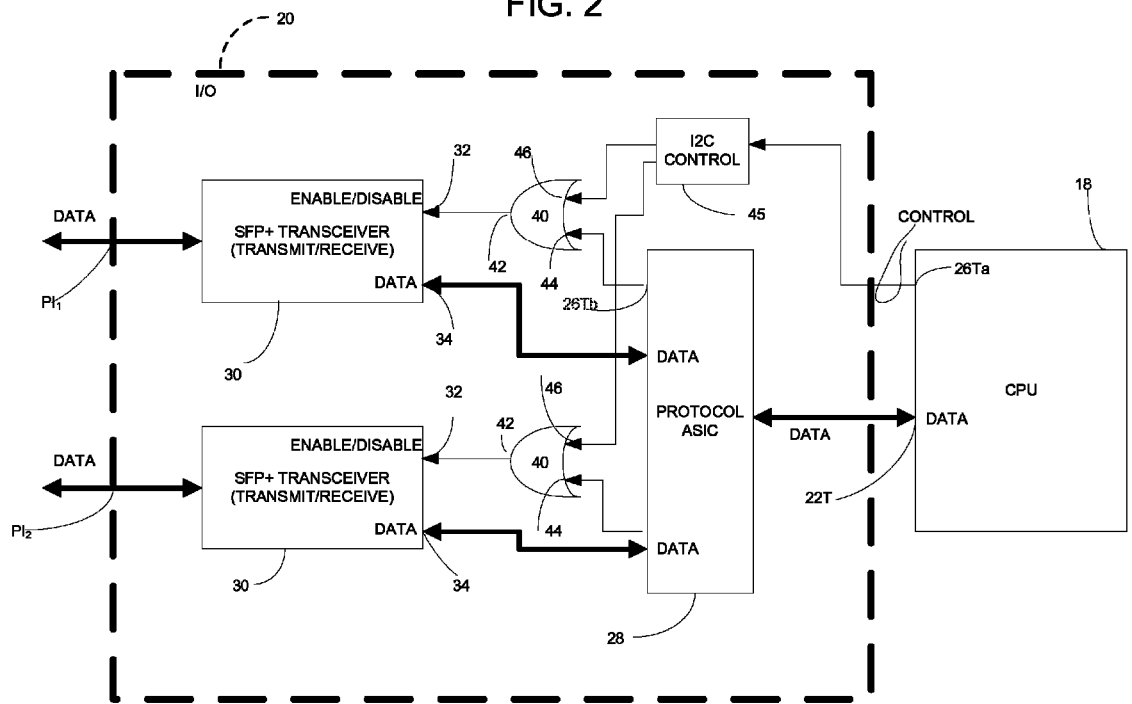
FIG. 2 is a block diagram of an exemplary one of a plurality of input/output sections used in the data storage system of FIG. 1 according to the invention.

Referring now to FIG. 2, the processor 18 has: a data transmit port 22T; and a control signal port, 26Ta, as shown in FIG. 2. The processor 18 produces at the control signal port 26Ta either a transmit enable signal or a transmit disable signal.

The exemplary one of the input/output sections 20 passing the user data between the host computer/server 12 (FIG. 1) and the processor 18. It is understood from FIG. 1 that other input/output sections 20 pass the user data between the bank of disk drives 16 and the processor 18. The exemplary input/output section 20 shown in FIG. 2 includes a transmit protocol translation section 28 coupled to the data transmit port 22T of the processor 18 for translating a protocol used by the user data passing from the bank of disk drives 16 to the processor 18 to a protocol used by the user data passing from the processor 18 to the host computer server 12.

The input/output section 20 also includes a pair of data optical transceiver 30 each one having: an data transmitter enable/disable terminal 32; and a transmit data terminal 34 for receiving the user data from transmit protocol translation section 28 and for optically transmitting the user data from the data transmit port 22T of the processor 18 through the transmit protocol translation section 28 and then to the host computer/server 12 in response to an transmit enable signal (here a logic 0 signal) fed to the data transmitter enable/disable terminal 32 of the transceiver 30 and for inhibiting the user data at the data transmit port 22T of the processor 18 from the passing from the transmit protocol translation section 28 and then to the host computer/server 12 in response to a transmit disable signal (here a logic 1 signal) fed to the data transmitter enable/disable terminal 32 of the transceiver 30.

Each one of the transceivers 30 is identical in construction and includes a laser, not shown. Here, the transceivers 30 are SFP+ transceivers. It is noted that when data is transmitted from the protocol translation section 28 to the transceiver 30, the translation section 28 produces a logic 0 signal at control signal port 26Tb. However, with such an arrangement, because the optical transceiver 30, and more particularly, the laser therein, remains on during an idle period after transmission of the data (i.e., an idle period between periods of data transmission the host computer/server remains optically connected to the transceiver 30 and therefore errors may be generated. Here, the processor 18 is able to turn the laser of by instructing the I2C control 45 to produce a logic 1 signal, such logic 1 signal being fed through an OR gate 40 to the data transmitter enable/disable terminal 32 of the transceiver 30 to thereby turn the laser off and disable the transceiver 30 during the idle period. Thus, the input/output section 20 produces a disable signal at a data transmitter enable/disable terminal 32 of the transceiver 30 in response to the transmit disable enable at the control signal (i.e., disable) port 27Ta of a processor 18 independent of the transmit control signal at the signal port 27Tb.

More particularly, gate 40 (here an OR gate) having: an output port 42 coupled to the data transmitter enable/disable terminal 32 of the transceiver 30 and; a pair of inputs 44, 46, one of the pair of inputs 46 being coupled to the first control signal port 26Ta through an I2C control unit 45 and the other one of the pair of inputs 44 is coupled a control signal port 26Tb of the protocol translation section 28. The output port 42 of gate 40 produces the transmit or receive enable signal at the SFP+ transceiver 30 enable/disable terminal 32 with a logic 0 when the enable signal is produced by the processor 18 at either the first control port 26Ta or the second control port 26Tb.

It is noted that after data has finished passing through SFP+ transceiver 30, the SFP transceiver 30 remains enabled (i.e., the optical laser turned on) until the next transmit or receive. It is undesirable to have the SFP+ transceiver 30 enabled with the optical laser on during this idle period. If the host computer/server remained connected via the transceiver 30, optical link errors may be generated due the optical laser being on. Here, the I2C control unit 45 is able to disable SFP+ transceiver 30 during this idle period. The protocol translation section 28 will not disable the SFP+ transceiver 30 optical laser after an enable is issued from processor 18 unless the link is reset which is also undesirable. The processor 18 solves this problem by enabling a logic "1" on gate 40 via the port 26Ta and output 42 will disable the SFP+ optical laser in transceiver 30 during idles with a logic "1". The processor 18 can then enable the optical laser via the port 26Ta and a logic "0" at port 42 when data needs to be transmitted or received. Thus, the output port 42 produces the disable signal at the data transmitter enable/disable terminal of the transceiver in response to the transmit disable enable at the disable signal port of the processor independent of the transmit control signal of the transmit signal port of the protocol translation section.

A number of embodiments of the invention have been described. Nevertheless, it will be understood that various modifications may be made without departing from the spirit and scope of the invention. Accordingly, other embodiments are within the scope of the following claims.

What is claimed is:

1. An input/output section comprising:
   (a) a transmit protocol translation section for translating a protocol used by user data passing from a bank of disk drives to a processor to a protocol used by the user data passing from the processor to the host computer or server, such transmit protocol translation section having a data port coupled to a data port of the processor and a transmit signal port for producing a transmit control signal;
   (b) a data transceiver having: an data transmitter enable/disable terminal; and a data terminal for receiving the user data from the transmit protocol translation section and for optically transmitting the user data from the processor through the transmit protocol translation section and then to the host computer or server in response to a transmit enable signal fed to the data transmitter enable/disable terminal and for inhibiting the user data from the processor from the passing from the transmit protocol translation section and then to the host computer or server in response to a transmit disable signal fed to the data transmitter enable/disable terminal;
   (c) a gate for producing the transmit disable signal at the data transmitter enable/disable terminal of the transceiver in response to the transmit disable signal at the enable/disable signal port of the processor independent of the transmit control signal at the transmit signal port of the protocol translation section.

2. A data storage system having a host computer or server, a bank of disk drives, and an interface for coupling user data between the host computer or server and the bank of disk drives; such interface comprising:
- (A) a processor for controlling user data as the user data passes between the host computer/server and the bank of disk drives, such processor having a disable signal port for producing a transmit disable signal; and
- (B) an input/output section comprising:
  - (a) a transmit protocol translation section for translating a protocol used by the user data passing from the bank of disk drives to the processor to a protocol used by the user data passing from the processor to the host computer server, such transmit protocol translation section having a data port coupled to a data port of the processor and a transmit signal port for producing a transmit control signal;
  - (b) a data transceiver having:
    - an data transmitter enable/disable terminal; and
    - a data terminal for receiving the user data from the transmit protocol translation section and for optically transmitting the user data from the processor through the transmit protocol translation section and then to the host computer/server in response to a transmit enable signal fed to the data transmitter enable/disable terminal and for inhibiting the user data from the processor from the passing from the transmit protocol translation section and then to the host computer or server in response to a transmit disable signal fed to the data transmitter enable/disable terminal;
  - (c) a gate having:
    - an output port coupled to the data transmitter enable/disable terminal of the transceiver; and
    - wherein the output port produces the transmit disable signal at the data 1 transmitter enable/disable terminal of the transceiver in response to the transmit disable signal at the disable signal port of the processor independent of the transmit control signal at the transmit signal port of the protocol translation section.

* * * * *